United States Patent
Witlicki et al.

(10) Patent No.: US 12,203,412 B2
(45) Date of Patent: Jan. 21, 2025

(54) TURBINE ENGINE SHAFT PLUG

(71) Applicant: Raytheon Technologies Corporation, Farmington, CT (US)

(72) Inventors: Russell B. Witlicki, Wethersfield, CT (US); Todd A. Davis, Tolland, CT (US); Ryan William Lureau, Manchester, CT (US); Shadd Andrew Bradshaw, Manchester, CT (US); Christopher M. Valva, Manchester, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 17/837,935

(22) Filed: Jun. 10, 2022

(65) Prior Publication Data
US 2023/0399978 A1  Dec. 14, 2023

(51) Int. Cl.
*F02C 7/06* (2006.01)

(52) U.S. Cl.
CPC ............ *F02C 7/06* (2013.01); *F05D 2220/32* (2013.01); *F05D 2240/55* (2013.01); *F05D 2240/61* (2013.01)

(58) Field of Classification Search
CPC .... F02C 7/06; F05D 2220/32; F05D 2240/55; F05D 2240/61
See application file for complete search history.

(56) References Cited

U.S. PATENT DOCUMENTS

| | | | |
|---|---|---|---|
| 2,911,267 A | 11/1959 | Small, Jr. | |
| 7,946,593 B2 | 5/2011 | Alam et al. | |
| 8,967,202 B2 | 3/2015 | Rejman | |
| 10,464,660 B2 | 11/2019 | Carvalho et al. | |
| 10,851,689 B2 | 12/2020 | Engel | |
| 11,274,571 B2 | 3/2022 | Campo et al. | |
| 2004/0062460 A1 | 4/2004 | Dusserre-Telmon et al. | |
| 2020/0131935 A1* | 4/2020 | Glahn | F01D 25/16 |
| 2020/0325908 A1* | 10/2020 | Chandramohanan | F02B 37/00 |

FOREIGN PATENT DOCUMENTS

| | | | |
|---|---|---|---|
| CN | 113356944 A | 9/2021 | |
| EP | 1406026 A1 | 4/2004 | |
| EP | 1460319 A1 | 9/2004 | |
| EP | 3299585 A1 | 3/2018 | |
| FR | 2949246 A1 | 2/2011 | |
| FR | 3119437 A1 | 8/2022 | |
| JP | S63208629 A | 8/1988 | |
| JP | 2017210954 A * | 11/2017 | ............ F01D 11/003 |

OTHER PUBLICATIONS

Machine Translation of JP2017210954A PDF File Name: "JP2017210954A_Machine_Translation.pdf".*
European Search Report dated Nov. 8, 2023 for European Patent Application No. 23164816.3.

* cited by examiner

*Primary Examiner* — Grant Moubry
*Assistant Examiner* — Ruben Picon-Feliciano
(74) *Attorney, Agent, or Firm* — Bachman & LaPointe, P.C.

(57) ABSTRACT

A gas turbine engine has a shaft having an inner diameter surface. A plug is mounted in the shaft. An oil nozzle is positioned to direct a flow of oil to an interior of the shaft. The plug has: a first section; a second section having an outer diameter periphery; and an axial gap between the first section and the second section.

22 Claims, 7 Drawing Sheets

TURBINE ENGINE SHAFT PLUG

U.S. GOVERNMENT RIGHTS

This invention was made with Government support awarded by the United States. The Government has certain rights in this invention.

BACKGROUND

The disclosure relates to gas turbine engines. More particularly, the disclosure relates to shaft plugs for gas turbine engines.

Gas turbine engines (used in propulsion and power applications and broadly inclusive of turbojets, turboprops, turbofans, turbo shafts, industrial gas turbines, and the like) typically have one or more hollow shafts.

In multi-spool engines, shaft sections of different spools may be concentrically nested. In one non-limiting example, one spool is identified as a high speed spool or high pressure spool and the other spool is identified as a low speed spool or low pressure spool. Each of these spools has a respective compressor section and a respective turbine section. A core flowpath (gaspath) passes sequentially through the low pressure compressor (LPC), high pressure compressor (HPC), combustor, high pressure turbine (HPT), and low pressure turbine (LPT). Depending upon the configuration, there may be a fan driving flow along one or more bypass flowpaths and typically driven by the low spool (directly or via gear reduction).

Some engines may have an additional spool. For example, some engines may replace the low spool with an intermediate spool and add an orphan low pressure turbine driving the fan and not a separate compressor section. Yet other more complex cycles are also envisioned.

Rear bearing compartments typically use an LPT shaft plug to contain the bearing compartment oil to the bearing area and prevent it from leaking into the LPT shaft. The plug is a single wall design that utilizes a non-metallic seal to seal between the shaft plug and the shaft. An example plug is recessed forward of the shaft aft/rear end. An oil nozzle behind the shaft or protruding into the shaft rear end may direct an oil flow against the aft surface of the plug. Centrifugal action drives the oil flow radially outward to then pass axially aftward along the inner diameter (ID) surface of the shaft. Such an oil flow thus cools both the plug and the portion of the shaft adjacent to and aft of the plug. The oil flow may pass radially outward through holes or other passageways in the shaft to lubricate the bearing and potentially provide additional cooling of components (e.g., the bearing races, carbon seals and their metallic seats, and the like).

Some engines use the LPT shaft as a conduit for secondary air flow such as high pressure bleed air for buffering the bearing compartment. In such an engine, the plug may block the air flow from exiting the rear end of the shaft and direct the air flow radially outward through ports in the shaft forward of the bearing and into a buffer chamber separated from the bearing compartment by a seal such as a carbon seal. The high pressure air thus buffers the carbon seal to counter or prevent oil leakage forward from the bearing compartment.

Thus, in some engines, the plug may be kept cool both by the buffering air forward and the bearing oil aftward. A non-metallic seal (e.g., outer diameter (OD) O-ring) may radially seal between the plug outer diameter (OD) surface and the shaft inner diameter (ID) surface. In one example, the plug may be a light radial interference fit adjacent the O-ring with relative forward movement of the plug prevented by cooperation of a rear flange of the plug with a shoulder of the shaft and aftward movement of the plug prevented by a retaining ring (e.g., a split snap ring accommodated in a radially-inwardly open channel in the shaft ID surface and abutting an aft surface of the flange).

An example plug is cup-shaped having a forward radial web and a stepped sidewall ending in an aft flange. The stepped sidewall may include first portions for contacting/seating the O-ring seal. At the aft end, the flange may protrude radially outward to act as a stop against an internal shoulder of the shaft as noted above.

The flange may protrude radially inward continuously and/or interruptedly. Continuous inward radial protrusion may create a dam or weir for collecting the centrifuged oil. Such a flange may also serve a removal function by inserting an expandable tool whose expanded fingers can catch against the forward surface of the inward radial protrusion and allow the tool to pull the plug out (e.g., after removing the snap ring). An interrupted inward radial protrusion allows use of a non-expanding tool whose fingers can pass through the interruptions and then be rotated to into registry with intact portions of the protrusion to then contact the forward face along those portions for plug extraction.

Proposed engine configurations operate at higher temperatures and/or may not use the LPT shaft as a conduit for secondary air flow. The higher temperature may cause issues with the shaft plug interference fit becoming loose and the seal compression becoming loose and/or with the seal (particularly non-metallic) experiencing damage due to the heat, which causes leaks. The plug may also have surfaces hot enough to have auto-ignition and oil coking issues.

SUMMARY

One aspect of the disclosure involves a gas turbine engine comprising: a shaft having an inner diameter surface forming a radial interior of the shaft; a plug mounted in the radial interior of the shaft; and an oil nozzle positioned to direct a flow of oil to the radial interior of the shaft. The plug has: a first section; a second section; and an axial gap between the first section and the second section.

In a further embodiment of any of the foregoing embodiments, additionally and/or alternatively, the oil nozzle is positioned to direct the cooling flow to the second section.

In a further embodiment of any of the foregoing embodiments, additionally and/or alternatively, the gap between the first section and the second section has a radial span of at least 30% of a radial span of the plug.

In a further embodiment of any of the foregoing embodiments, additionally and/or alternatively, the gap between the first section and the second section extends over at least 30% of a transverse footprint of the plug.

In a further embodiment of any of the foregoing embodiments, additionally and/or alternatively, the gap between the first section and the second section has an axial length of at least 1.0 mm over at least 30% of a transverse footprint of the plug.

In a further embodiment of any of the foregoing embodiments, additionally and/or alternatively, the gap is a full annulus gap.

In a further embodiment of any of the foregoing embodiments, additionally and/or alternatively, the first section has an outer diameter periphery interference fit to the shaft inner diameter surface.

In a further embodiment of any of the foregoing embodiments, additionally and/or alternatively, a metallic C-seal seals the first section to the shaft inner diameter surface; and a non-metallic seal seals the second section to the shaft inner diameter surface.

In a further embodiment of any of the foregoing embodiments, additionally and/or alternatively: a first piece forms the first section including a hub; and a second piece, mounted to the first piece, forms the second section.

In a further embodiment of any of the foregoing embodiments, additionally and/or alternatively, a threaded fastener extends centrally through the second piece into threaded engagement with the first piece forms means to secure the second piece to the first piece.

In a further embodiment of any of the foregoing embodiments, additionally and/or alternatively, the first section is a stainless steel and the second section is a nickel alloy.

In a further embodiment of any of the foregoing embodiments, additionally and/or alternatively: the first section is a first cup-shaped structure having a sidewall extending aft from a forward web; the second section of a second cup-shaped structure having a sidewall extending aft from an aft web; and the sidewall of the second cup-shaped structure has an aft junction with the sidewall of the first cup-shaped structure.

In a further embodiment of any of the foregoing embodiments, additionally and/or alternatively, the junction comprises a weld joint.

In a further embodiment of any of the foregoing embodiments, additionally and/or alternatively, the first cup-shaped structure sidewall has a step bearing against a shoulder of the shaft.

In a further embodiment of any of the foregoing embodiments, additionally and/or alternatively, a bearing supports the shaft in a bearing compartment and a seal seals the bearing compartment.

In a further embodiment of any of the foregoing embodiments, additionally and/or alternatively, the gas turbine engine has a rear cover for the bearing compartment.

In a further embodiment of any of the foregoing embodiments, additionally and/or alternatively, the gas turbine engine lacks a buffer air flowpath centrally through the shaft to the bearing compartment.

In a further embodiment of any of the foregoing embodiments, additionally and/or alternatively, the gas turbine engine has one or more apertures through the shaft for passing oil from the flow of oil to lubricate the bearing.

In a further embodiment of any of the foregoing embodiments, additionally and/or alternatively, a method for using the gas turbine engine comprises: driving rotation of the shaft; and passing the flow of oil to contact the second section, the rotation of the shaft centrifugally driving the flow radially outward to pass through one or more apertures in the shaft to lubricate the bearing.

In a further embodiment of any of the foregoing embodiments, additionally and/or alternatively, there is not a cooling airflow directed to the first section.

The details of one or more embodiments are set forth in the accompanying drawings and the description below. Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
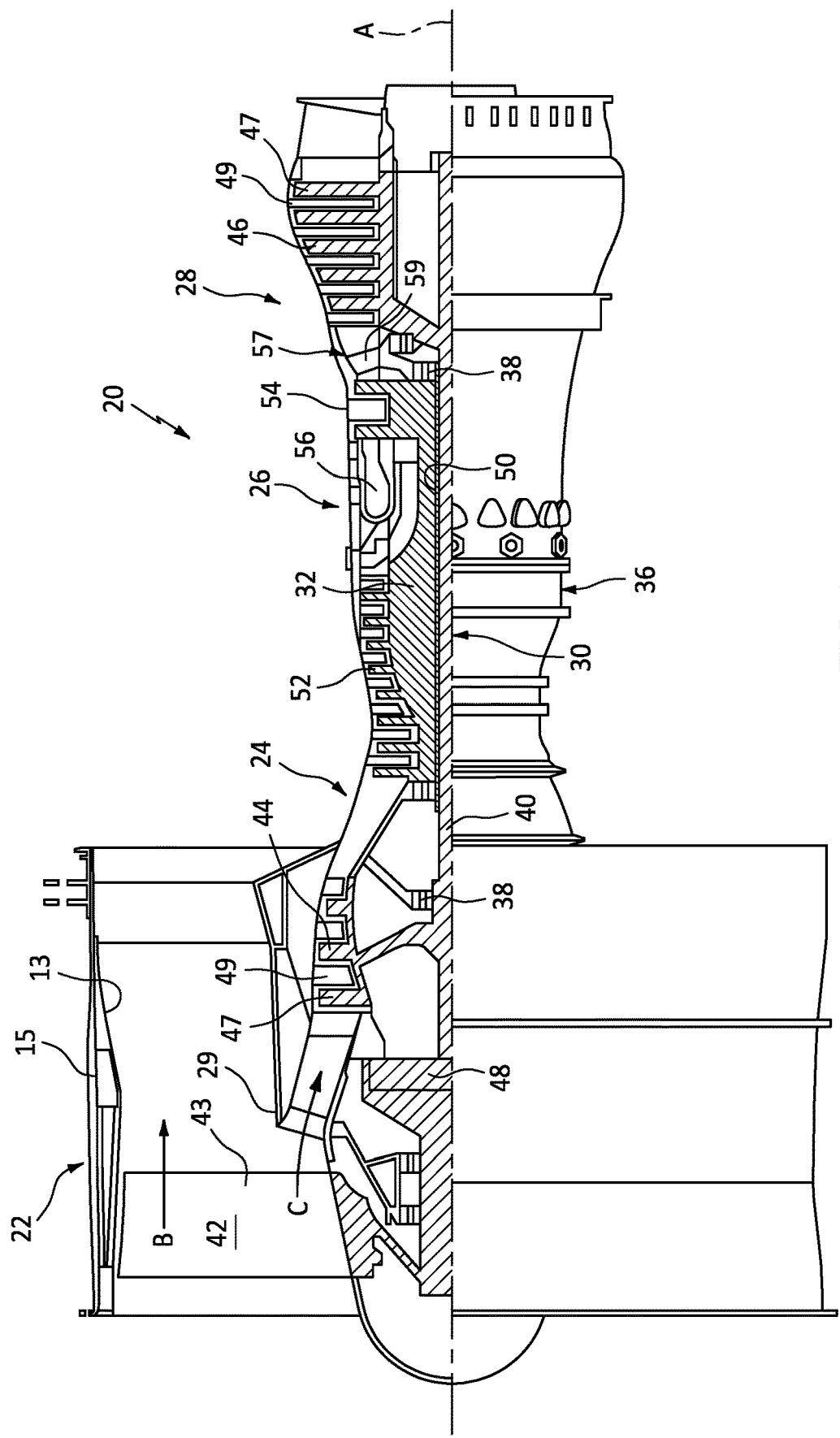
FIG. 1 is a partially schematic central axial sectional view of a gas turbine engine.

A single-wall plug may be temperature limited. Proposed engine configurations operate at higher temperature and/or may not use the LPT shaft as a conduit for secondary air flow (e.g., bearing compartment seal buffering air). The higher temperature may cause issues (notably leakage) with the shaft plug interference fit becoming loose and the seal compression becoming loose (e.g., for a metallic seal) and/or with the seal experiencing damage due to the heat (e.g., for a non-metallic seal). A single-wall plug can also have surfaces hot enough to have auto-ignition and oil coking issues.

For example, differential thermal expansion of the plug and the surrounding portion of the shaft may be increased by higher temperature operation. For example, the shaft may expand more than the plug. This differential thermal expansion may require a greater range of radial flexing of the seal. With aggressive cooling of the plug, greater thermal expansion of the shaft relative to the plug may decompress the metallic seal. Thus, a metallic seal may have sufficient heat resistance but not sufficient radial range. However, a non-metallic seal may have sufficient compliance for such a radial range but not have sufficient heat resistance.

Even with aggressive operational cooling, differential thermal expansion is still a problem. This may be particularly relevant in transient conditions. One example of a transient condition is a post-running soak-back condition. For example, even an aggressively cooled plug cooled both by oil from the rear and air from the front may keep a non-metallic seal within acceptable temperature limits during operational range to avoid seal damage and/or may keep the temperature difference between the plug and the adjacent portion of the shaft low enough to maintain engagement of a metallic seal. However, upon shutting down of the engine, the cooling air and/or oil flows may terminate. Heat from a previously uncooled portion of the shaft (e.g., forward of the plug) and/or passing radially inward through a rotor hub may substantially raise the temperature of the formerly-cooled shaft adjacent the plug in a soak-back situation. This potentially can damage the non-metallic seal. Higher operational temperatures will increase these effects.

To facilitate such higher temperature operation, reduced cooling, and the like, a two-layer (double-wall) plug may have a forward first wall, portion or section separated from an aft second wall, portion or section by a gap. The aft portion may be cooled by the oil flow while the gap allows the forward portion to be at a different temperature from the aft portion and/or thermally expand/contract differently than the aft portion. The example gap is an empty air gap (e.g., lacking any insulative fill). Insulative fill in the gap may tend to absorb oil leakage and detrimentally reduce thermal isolation, cause rotational imbalance, and the like.

For example, the aft portion can shield the forward portion from the cold jet of oil. This allows the forward portion to operate at a hotter temperature and grow thermally (relative to the aft portion) to maintain shaft engagement. The air gap in between the two shaft plug portions further insulates/thermally isolates the forward portion from the aft portion.

The forward portion may be formed of a material with a higher coefficient of thermal expansion (CTE) than the aft portion and/or of a baseline plug and/or of the shaft. This may enhance the interference fit of the forward portion with the LPT shaft to remain tight and the high temperature capable metal C-seal to remain in its compressed state. Example material combinations are: a stainless steel (e.g., A286/UNS S66286) for the forward portion; and nickel-based superalloy (e.g., Inconel 718/UNS N07718/AMS 5562)for the aft portion and shaft. Published A286 CTE at 760° C. is $18.6 \times 10^{-6}$/K. Published IN-718 CTE at 760° C. is $16.0 \times 10^{-6}$/K. Thus the example high CTE portion is about 16% higher CTE than the lower CTE portion. An example range is at least 5.0% higher (e.g., 5.0% to 30% or 10.0% to 25% higher).

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 may include a single-stage fan 42 having a plurality of fan blades 43. The fan blades 43 may have a fixed stagger angle or may have a variable pitch to direct incoming airflow from an engine inlet. The fan 42 drives air along a bypass flow path B in a bypass duct 13 defined within a housing 15 such as a fan case or nacelle, and also drives air along a core flow path C for compression and communication into the combustor section 26 then expansion through the turbine section 28. A splitter 29 aft of the fan 42 divides the air between the bypass flow path B and the core flow path C. The housing 15 may surround the fan 42 to establish an outer diameter of the bypass duct 13. The splitter 29 may establish an inner diameter of the bypass duct 13. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in the example gas turbine engine 20 is illustrated as a geared architecture 48 to drive the fan 42 at a lower speed than the low speed spool 30. The inner shaft 40 may interconnect the low pressure compressor (LPC) 44 and low pressure turbine (LPT) 46 such that the low pressure compressor 44 and low pressure turbine 46 are rotatable at a common speed and in a common direction. In other embodiments, the low pressure turbine 46 drives both the fan 42 and low pressure compressor 44 through the geared architecture 48 such that the fan 42 and low pressure compressor 44 are rotatable at a common speed. Although this application discloses geared architecture 48, its teaching may benefit direct drive engines having no geared architecture. The high speed spool 32 includes an outer shaft 50 that interconnects a second (or high) pressure compressor (HPC) 52 and a second (or high) pressure turbine (HPT) 54. A combustor 56 is arranged in the example gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

Airflow in the core flow path C is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core flow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The low pressure compressor 44, high pressure compressor 52, high pressure turbine 54 and low pressure turbine 46 each include one or more stages having a row of rotatable airfoils. Each stage may include a row of static vanes adjacent the rotatable airfoils. The rotatable airfoils and vanes are schematically indicated at 47 and 49.

The engine 20 may be a high-bypass geared aircraft engine. The bypass ratio can be greater than or equal to 10.0 and less than or equal to about 18.0, or more narrowly can be less than or equal to 16.0. The geared architecture 48 may be an epicyclic gear train, such as a planetary gear system or a star gear system. The epicyclic gear train may include a sun gear, a ring gear, a plurality of intermediate gears meshing with the sun gear and ring gear, and a carrier that supports the intermediate gears. The sun gear may provide an input to the gear train. The ring gear (e.g., star gear system) or carrier (e.g., planetary gear system) may provide an output of the gear train to drive the fan 42. A gear reduction ratio may be greater than or equal to 2.3, or more narrowly greater than or equal to 3.0, and in some embodiments the gear reduction ratio is greater than or equal to 3.4. The gear reduction ratio may be less than or equal to 4.0. The fan diameter is significantly larger than that of the low pressure compressor 44. The low pressure turbine 46 can have a pressure ratio that is greater than or equal to 8.0 and in some embodiments is greater than or equal to 10.0. The low pressure turbine pressure ratio can be less than or equal to 13.0, or more narrowly less than or equal to 12.0. Low pressure turbine 46 pressure ratio is pressure measured prior to an inlet of low pressure turbine 46 as related to the pressure at the outlet of the low pressure turbine 46 prior to an exhaust nozzle. It should be understood, however, that the above parameters are only example of one embodiment of a geared architecture engine and that the present disclosure is applicable to other gas turbine engines including direct drive turbofans. All of these parameters are measured at the cruise condition described below.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above, and those in the next paragraph are measured at this condition unless otherwise specified.

"Low fan pressure ratio" is the pressure ratio across the fan blade 43 alone, without a Fan Exit Guide Vane ("FEGV") system. A distance is established in a radial direction between the inner and outer diameters of the bypass duct 13 at an axial position corresponding to a leading edge of the splitter 29 relative to the engine central longitudinal axis A. The low fan pressure ratio is a spanwise average of the pressure ratios measured across the fan blade 43 alone over radial positions corresponding to the distance. The low fan pressure ratio can be less than or equal to 1.45, or more narrowly greater than or equal to 1.25, such as between 1.30 and 1.40. "Low corrected fan tip speed" is the actual fan tip speed in ft/sec divided by an industry standard temperature correction of $[(\text{Tram } ° R)/(518.7° R)]^{0.5}$. The "low corrected fan tip speed" can be less than or equal to 1150.0 ft/second (350.5 meters/second), and greater than or equal to 1000.0 ft/second (304.8 meters/second).

Figure 1A:
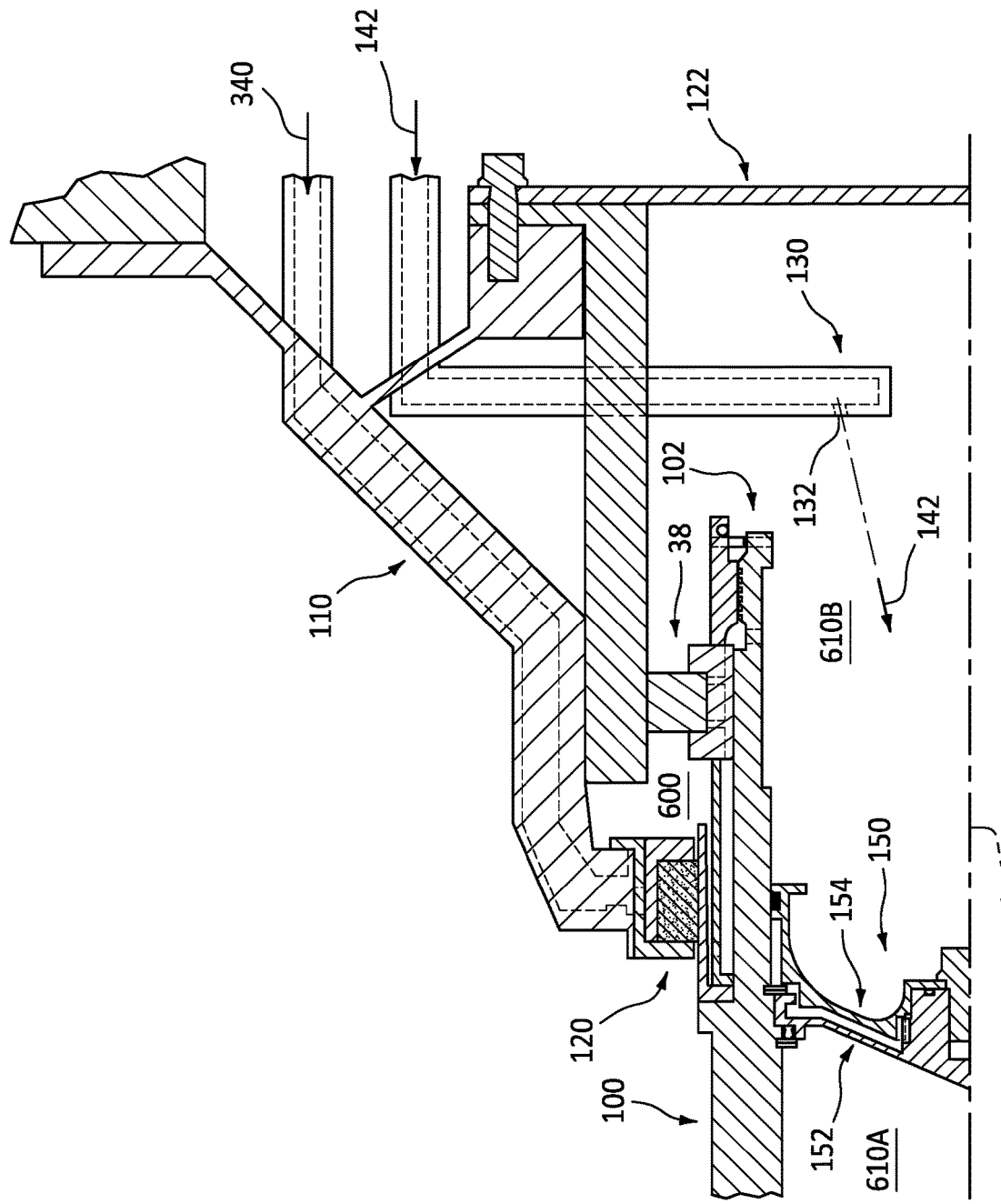
FIG. 1A is an enlarged view of a rear bearing area of the engine of FIG. 1.

Each spool 30, 32 may generically be referred to as including an associated shaft 50. However, the shaft of a given spool may itself be referred to as including respective shafts associated with each of its sections with the section shafts being portions of the larger spool shaft and/or pieces of an assembly forming the spool shaft and/or subassemblies of the spool shaft assembly. Thus, the low spool shaft 40 may include a section or subassembly identified as the low pressure turbine (LPT) shaft 100 (FIG. 1A). The example low spool shaft 40 and its LPT shaft (section) 100 extend from a respective front or forward end to a shared aft or rear end 102 and have an interior or inner diameter (ID) surface. One of the bearing systems (bearings) 38 (an aftmost or rear most main bearing in the example) supports the LPT shaft for rotation about the axis/centerline A relative to engine static structure. For example, the bearing may be a rolling element bearing (ball or roller and optionally single or duplex) with an inner race mounted directly or indirectly to the LPT shaft outer diameter (OD) surface and an outer race mounted to static structure 110 (e.g., a static hub coupled to an exterior case via a vane or strut array extending through the gaspath). Depending on implementation, the case structure may be mounted directly within a fuselage or may be within a nacelle mounted to an aircraft wing via a pylon among other options.

The bearing is in a bearing compartment 600. The example bearing compartment is closed to one side of the bearing (e.g., forward of the bearing) via a seal system 120 (e.g., a carbon seal system). A similar seal system may close the compartment to the opposite side. However, in the example, the opposite side (aft side) is enclosed by a large bearing compartment cover 122 mounted to the static structure.

Discussed further below, one or more oil nozzles 130 may be conventionally positioned to direct an oil flow 142 from one or more outlet(s) 132 toward the interior of the shaft 100 to contact the shaft plug 150. The plug 150 divides a forward portion 610A of the shaft interior from an aft portion 610B of the shaft interior. In the illustrated example, the forward portion lacks vents that in other implementations would provide buffering airflow to a buffer chamber opposite the seal system 120 from the bearing compartment 600. In the illustrated example lacking an aft seal for the bearing compartment, the shaft interior aft portion 610B is contiguous with the bearing compartment. Nevertheless, alternative implementations may have aft seals for the bearing compartment. The example plug 150 is an assembly including a separate forward (fore) portion or section (first section) 152, an aft (rear) portion or section (second section) 154. For ease of reference, these may respectively be referenced as a forward plug and an aft plug that form the plug 150 as a plug assembly. Alternatives do not assemble the two plug portions to each other in which case the two portions may alternatively be termed as two separate plugs or a tandem plug or plugs. Further alternatives may have a unitary single piece construction of the two portions or sections.

Figure 1B:
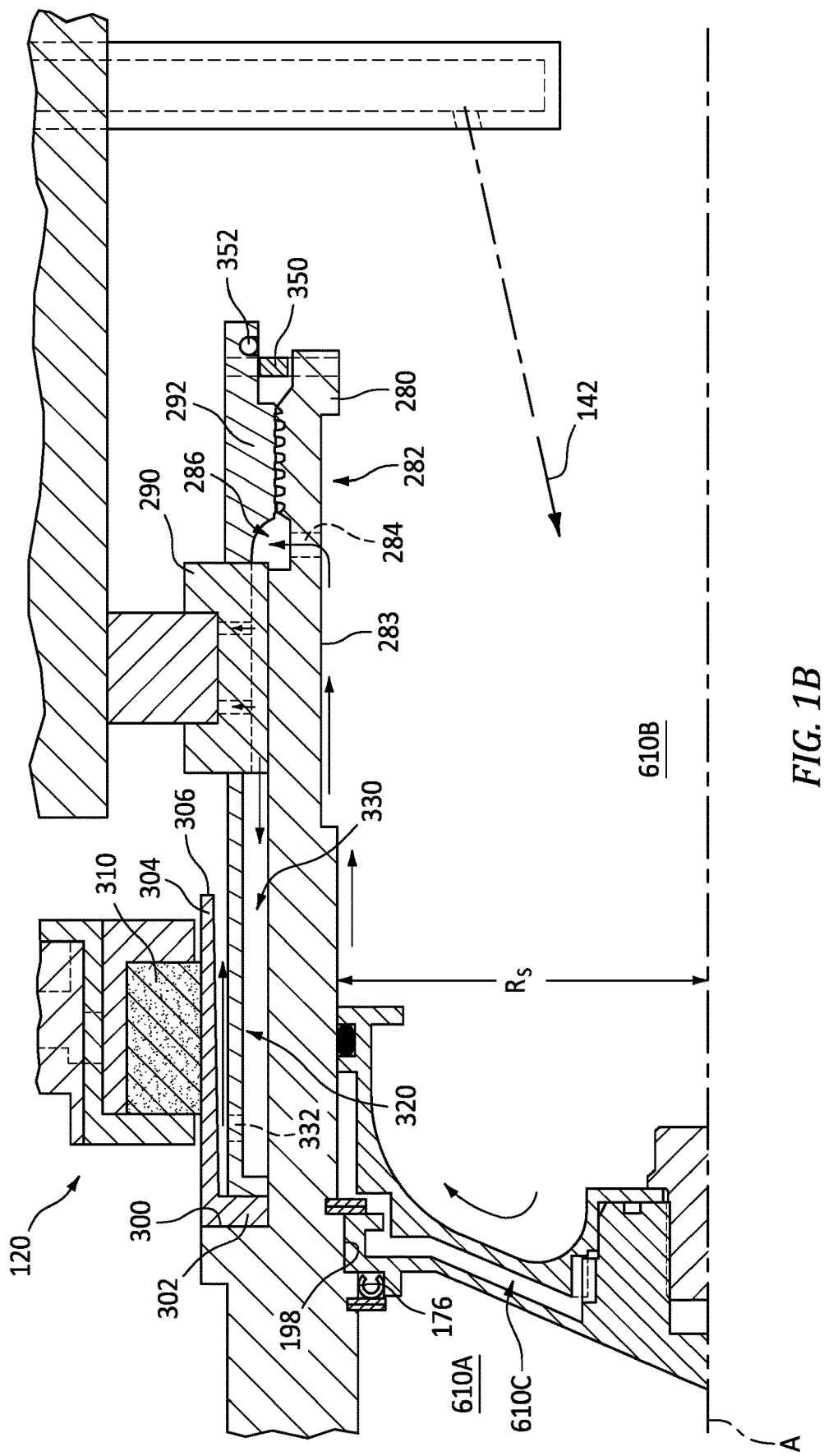
FIG. 1B is a further enlarged view of the rear bearing area.
Figure 1C:
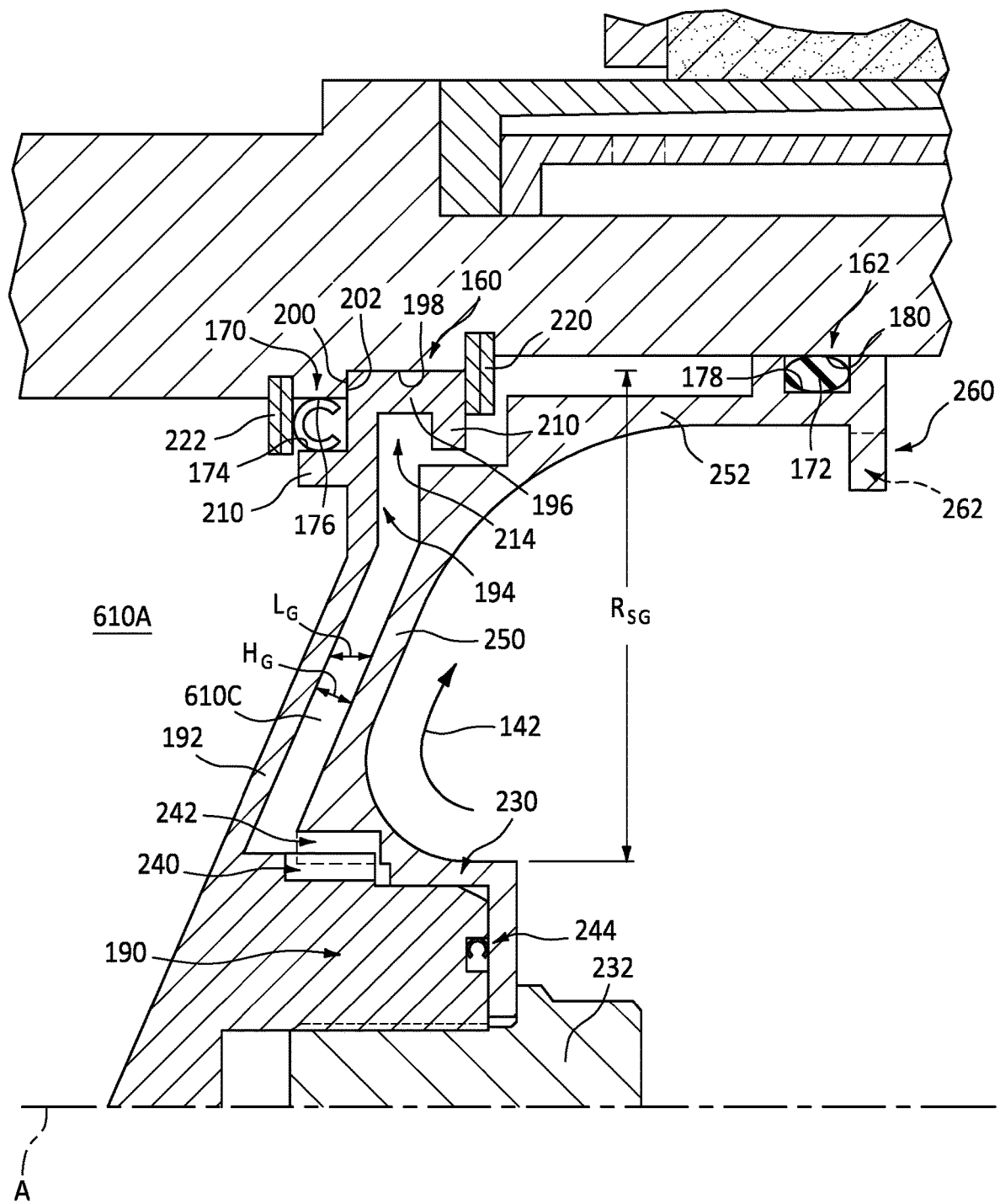
FIG. 1C is a further enlarged view of a shaft plug of the rear bearing area.

The forward plug 152 and aft plug 154 are separated by a gap 610C (FIG. 1B) which extends for a substantial fraction of the total radial span $R_S$ of the plug. FIG. 1C shows the total radial span of the gap as $R_{SG}$. At any given axial position, the gap may have a smaller radial height. FIG. 1C also shows a local length LG of the gap 610C. The forward plug 152 and aft plug 154 have respective junctions 160, 162 (FIG. 1C) with the shaft ID surface and are sealed via respective seals 170, 172. The forward plug is sealed to the shaft via a metallic seal 170 (e.g., metallic C-seal). The example C-seal is an axially-open C-seal. The example C-seal is open rearward and radially pinched between an OD seating surface 174 of the forward plug and an ID seating surface 176 of the shaft. The example rearward openness is for ease of assembly. The example aft plug seal (aft seal) 172 is radially captured between an OD seating surface 178 of the aft plug and an ID seating surface 180 of the shaft. The example aft seal 172 is a non-metallic seal. An example non-metallic seal is an elastomeric seal. An example elastomeric seal is a perfluoroelastomeric seal. Example perfluoroelastomeric compounds are FFKMs (by ASTM 1418 standard) or FFPMs (by ISO/DIN 1629 standard) such as Kalrez® elastomers of DuPont Polymers, Inc., Wilmington Delaware. The example aft seal is a FFKM O-ring. This O-ring prevents oil from getting near the forward shaft plug. FFKM offers higher temperature capability than typical fluoroelastomers.

As noted above, the forward plug 152 may be of a higher CTE material than the aft plug 154. FIG. 1C shows the forward plug as comprising a central hub section 190 from which a web 192 extends radially outward to an OD section 194 that includes seal seat features and features for mating with the shaft. The latter includes an axially-extending OD sleeve 196 whose OD surface is dimensioned for interference fit with the ID surface 198 of a shoulder within the shaft. The forward surface 200 of the sleeve 196 abuts an axial-facing (radially extending) face 202 of the shoulder. The shaft seating surface 176 extends forward from this face 202. The forward plug 152 seal seating surface 174 extends as the OD surface of a forwardly-extending sleeve section 210 of a unitary single piece forward plug 152.

At the aft end of the first portion OD sleeve 196, a radial flange or web 210 extends slightly inward to create an inwardly-open channel 214. In use, this channel allows insertion of a tool to extract the plug forward plug 152 (e.g., an expanding tool may be inserted through the aperture of the web 210 and expand it to backlock against the forward surface of the web to permit extraction of the forward plug 152 via pulling on the tool). Alternatively, the web 210 may be interrupted/radially castellated so as to allow insertion and rotation of a non-expanding tool to backlock in more of a bayonet fitting interaction. The example forward plug 152 is shown captured against rearward movement via an internal retaining ring (e.g., split ring) 220 carried in an inwardly open channel/groove in the shaft and abutting the aft surface of the sleeve and web. Similarly, the abutting of surfaces 200 and 202 prevents forward movement. Additionally, the metallic seal 170 is captured against forward movement via an internal retaining ring (e.g., split ring) 222 carried in an inwardly open channel/groove in the shaft.

The aft plug 154 also includes a hub section (hub) 230 that mounts to the hub 190 of the forward plug 152. In this example, a rear portion of the forward plug hub is received in a forwardly-open compartment of the aft plug hub. The higher CTE of the hub 190 relative to the CTE of the hub 230 may help create or maintain a thermal interference fit. For example, even if not interfering if at the same temperature (e.g., equilibrated at an ambient temperature), increased temperature may bring the two into interference by relatively expanding the hub 190 within the hub 230. An isothermal thermal interference fit may be achieved by heating the aft hub 230 or cooling the front hub 190 prior to assembly. Alternative isothermal interference fits may be mechanically achieved via forcing together using a hydraulic or other actuator.

The two hubs may be secured to each other such as via one or more threaded fasteners 232. Depending upon implementation, the threaded fasteners may represent a bolt circle or, in the illustrated example, a single central axial bolt or screw threaded through an aperture of the aft hub into a threaded bore of the forward hub. The hubs may have angular registration/antirotation features such as interfitting splines 240, 242 on the OD of the forward hub and ID of the aft hub. A seal 244 (e.g., metallic seal such as a radially inwardly open C-seal may seal the two hubs).

The aft plug 154 also includes a web 250 extending radially outward from the aft hub 230 to an outer diameter (OD) sleeve section 252. The sleeve section may bear seating features for the aft seal 172 and may also have a radially inwardly extending flange 260 for extractor engagement.

At the aft end of the sleeve section 252, the aft plug 154 may have a radial flange or web 260 extending slightly inward. This may facilitate extraction of the aft plug as noted above for forward plug 152 extraction via its web 210. The example aft plug web 260 has features for tool engagement to prevent rotation of the plugs 152, 154 during fastener installation and removal. Example features are interruptions 262 forming splines in the web 260 ID surface for engagement by a splined tool.

The aft surface of the aft plug 154 has a continuously curving transition. Along most of the web 250 and transitioning to the sleeve, this curves aftward from radially inboard to outboard. This curving nature allows centrifugal action to maintain the centrifuged oil flow 142 to pass along the aft surface of the aft plug so that the partial rearward angling of the plug web maintains flow attachment to the aft surface, turning the aft surface more axial toward the aft/rear end of the aft plug. The example oil flow 142 passes via radially outward stepping with a first step occurring at the aft end of the aft plug to the shaft ID surface (FIG. 1B). The next step is formed in the shaft ID surface passing the oil flow further aftward. The shaft includes a radially inwardly extending wall 280 at an aft end cooperating with the last step to define a radially inwardly open collection channel 282 having an outer diameter base surface portion 283.

A potential leakage path is also stepped and partially overlaps sharing a final step from the ID seating surface 180 to the collection channel base surface 283. A next forward step of the potential leakage path is from the shoulder ID surface 198 to the ID seating surface 180. A next forward step of the potential leakage path is from the ID seating surface 176 for the C-seal to the shoulder ID surface 198. This stepping helps return any potential leakage flow of oil to the collection channel 282.

At the collection channel 282, a circumferentially arrayed plurality of ports 284 extend radially through the shaft to pass branches of the flow 142 to a collection plenum 286. The example plenum 286 is formed by an outer diameter channel in the shaft, a radially inboard aft end section of a bearing inner race 290, and a forwardly and radially inwardly open channel in a retaining nut 292 threaded to the shaft and axially holding the inner race in place. The example inner race is held in a stack against an outer shoulder surface 300 of the shaft with, from fore to aft, a flange 302 of a seal runner having an aft runner section 304 extending aftward from an outer diameter junction with the flange 302 to a free distal end 306. The carbon seal element 310 of seal system 120 has an inner diameter (ID) surface in sealing engagement with the outer diameter (OD) surface of the runner section 304. In this illustrated example, the seal is a shaft seal. Alternative seals may be face seals. The stack includes a spacer 320 intervening between the seal runner and the bearing ID race 290. The spacer 320 has a forward flange of a forward face abutting an aft face of the runner flange 302. The spacer has a sleeve extending aftward to a free distal end abutting the forward face of the ID race 290 to transmit stack compression. The sleeve is radially outwardly spaced from the shaft OD surface to create a plenum 330 and has a circumferential array of apertures 332.

In operation, oil flow 142 from the plenum 286 passes through axial passageways (e.g., axial grooves in the ID race) with further branching of a portion of this flow passing to the rolling elements to lubricate the rolling elements. The remainder of this flow passes forward to the plenum 330 and then outward through the ports 332. Flow exiting in the ports 332 contacts the ID surface of the seal runner portion 304 to cool the seal runner.

Additionally, in the example, the buffering airflow 340 (FIG. 1A) may pass to the seal system through one or more passageways in the static structure. This may take the place of delivering a buffering airflow through the shaft.

An example oil source of the flow 142 is the engine lubrication pump (not shown).

An example air source for the buffering flow 340 is a compressor bleed.

With a plug radial span noted as $R_S$ as discussed above, the transverse footprint of the plug, for a circular plug, is $\pi$ times the square of that radial span. Example $R_S$ is 10.0 millimeters to 100 millimeters with most common baseline engines in the range of 15.0 millimeters to 80.0 millimeters and many in the range of 30.0 millimeters to 60.0 millimeters. To provide advantageous insulation between the two plug portions, the gap advantageously occupies a significant area of that footprint and a significant radial fraction of that footprint. For example, the gap radial span may represent at least 30% of the plug radial span or at least 50%. Depending upon the connection (if any) between the two plugs or plug portions, the percentage may be the full 100% or may be a slightly smaller amount such as 95% or 99% (see further examples below for plug portions not connected at hubs). A large fraction of the area may also be involved with the example gap extending over at least 30% of the transverse footprint of the plug or at least 50% or at least 70% with an example 70% to 99%. To provide advantageous performance, the gap may have a length of an example at least 1.0 millimeter over said portion of the radial span and/or transverse footprint. However, locally the gap may be smaller. More broadly, that axial length range may be an example 1.0 millimeter to 20 millimeters or 2.0 millimeter to 20 millimeters over said portion of the radial span and/or transverse footprint. Additionally, the gap may be full annulus along such a radial fraction of a radial span to thermally decouple the two portions. In the example, it is seen that the axial gap gets very large near the OD. Even there, the example radial gap between the aft section and the shaft is about the same as the roughly median axial gap between the two sections. This median axial gap (e.g., as per area median over such portion where there is a nonzero and non-infinite axial gap) may be an example 1.0 millimeter to 5.0 millimeters (with diminishing returns on isolation v. weight occurring at about 2.5 millimeters to 3.0 millimeters of gap measured as a gap height HG directly between the surfaces (i.e., at the angle of smallest gap between surfaces)).

Figure 2:
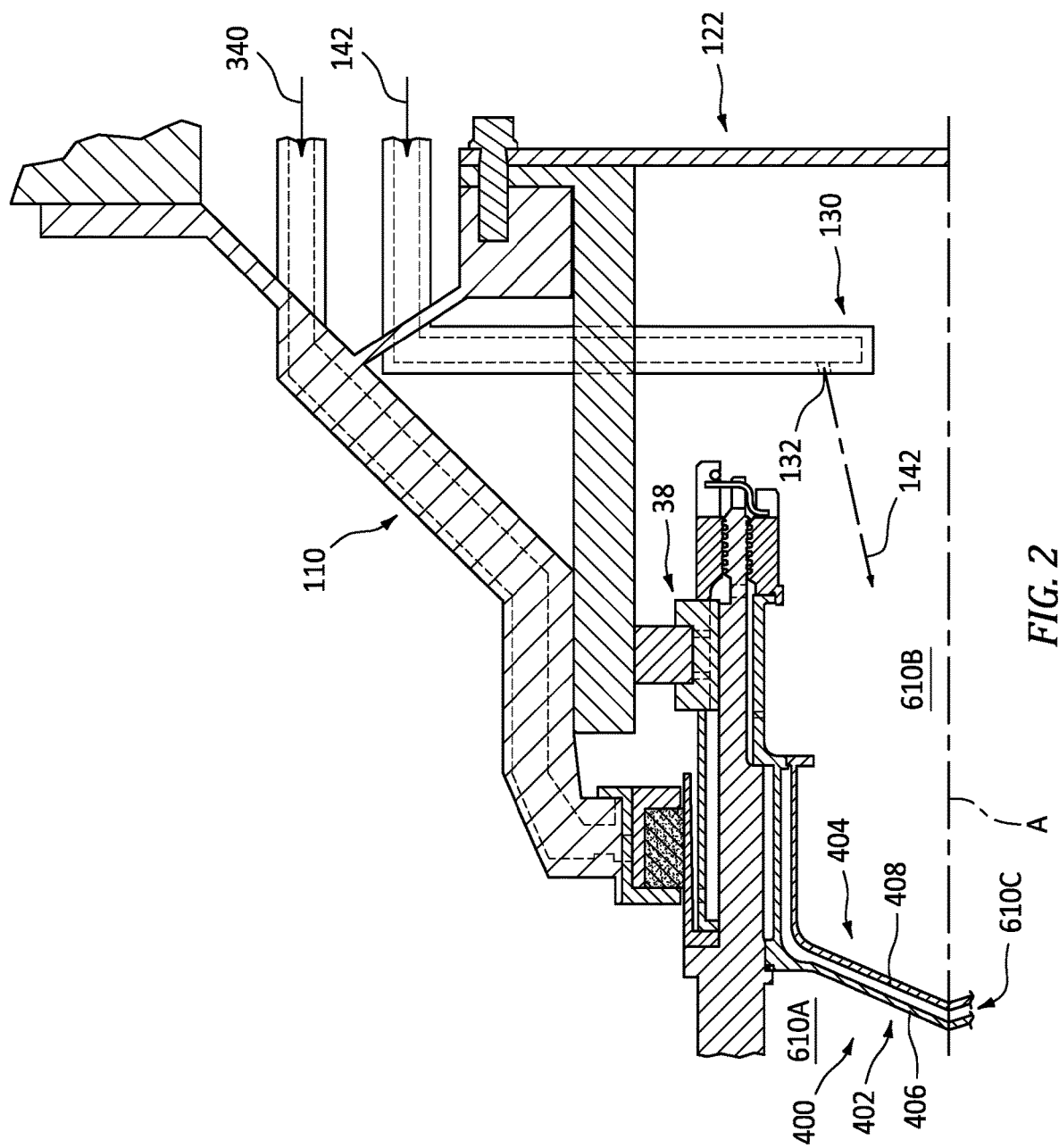
FIG. 2 is an enlarged central axial sectional view of a rear bearing area of a first alternate gas turbine engine.

FIG. 2 shows an alternative configuration of a plug 400 which may be similar to the FIG. 1 plug 150 but wherein connection between the forward plug 402 and the aft plug 404 is radially outboard rather than centrally. Each plug/section has a web 406, 408 extending radially outward from the axis/centerline spaced apart from the other web by the gap. Each web transitions to a sleeve portion 410, 412 (FIG. 2A) extending aftward to a connection 414 between the two plugs/sections 402, 404. The example connection 414 is at a terminal radial flange 418 of the aft plug and an intermediate radial flange 416 of the forward plug. In one group of implementations, the portions are separately formed (e.g., cast and machined or drawn and machined or forged and machined, and/or formed as a weldment) and then welded or brazed to each other at this junction. Such welding or brazing requires a certain degree of compatibility of the materials. This may compromise the opportunity for use of different CTE materials. Thus, for welding, both portions may be made of nickel-based superalloy (e.g., a single alloy). As an alternative to a weld or braze, an additive process may involve creating the two portions as a single piece (optionally of a single material). An example additive process is direct metal laser sintering (DMLS). Thus in such a situation the junction may be a virtual boundary between two sections of a single piece rather than a joint between two preexisting pieces.

Figure 2A:
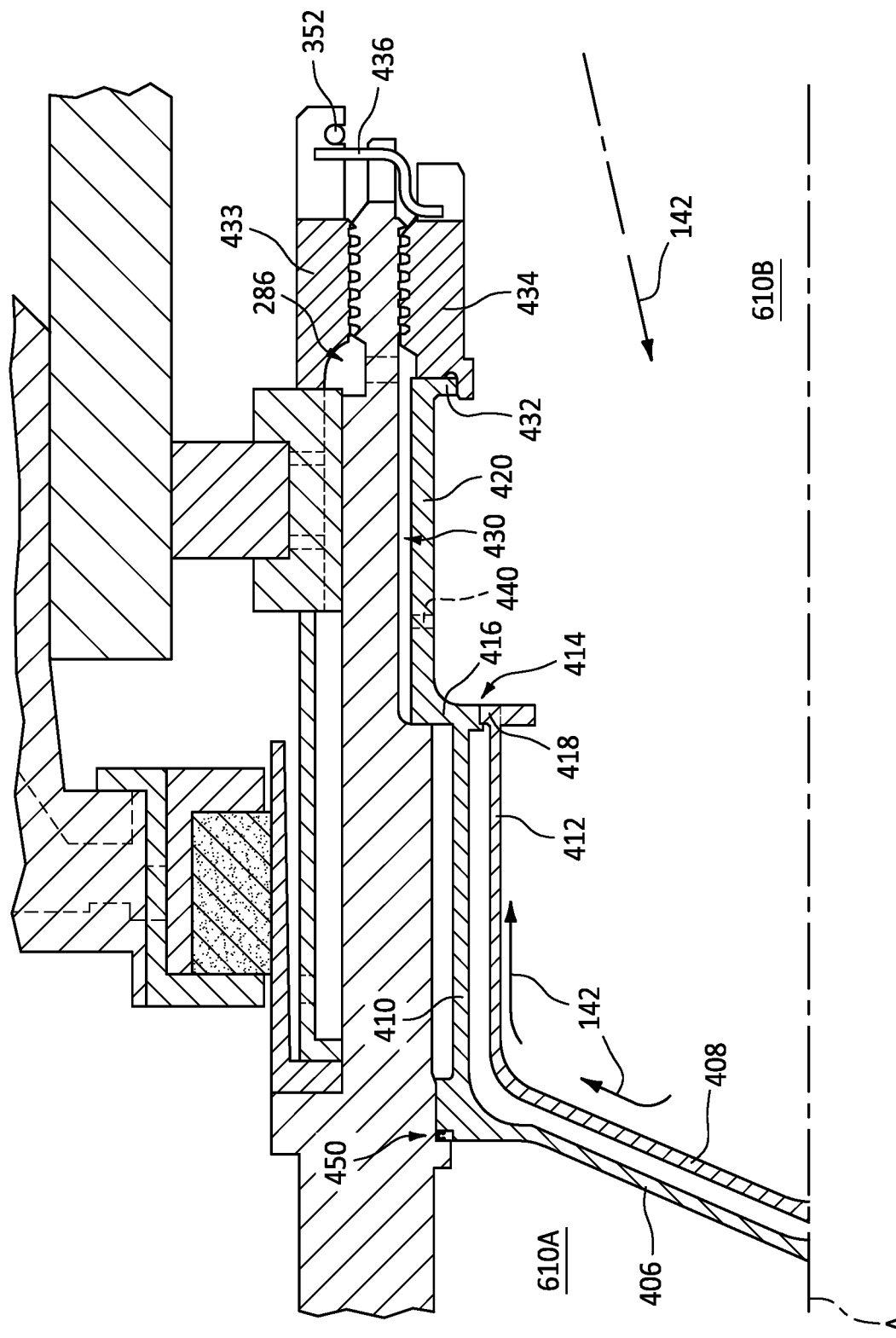
FIG. 2A is an enlarged view of a rear bearing area of the engine of FIG. 2.

In this example, the forward plug includes a second sleeve portion 420 extending aft from the intermediate web and radially spaced from the shaft to define a cooling oil feed plenum 430. The second sleeve portion extends to an aft flange 432 at a rear end/rim of the forward plug 402. To hold the example assembly of the two portions in place, an externally-threaded nut (internal or ID nut) 434 engages an internal thread of the shaft inboard of an internally-threaded nut 433 which may be similar to the nut 292 of the FIG. 1 embodiment. FIGS. 1B and 2A also show further details of example lock washers (e.g., radially castellated) 350, 436, lock wires 352, or other features for securing the nuts in place. Thus, the nut 433 may differ from the nut 292 by recesses for engaging a second castellated lock washer.

The example ID nut 434 holds the second sleeve portion 420 in axial compression between the nut and an internal shoulder of the shaft. A circumferential array of holes 440 extend through the second sleeve portion 420 to pass the oil flow to the plenum 430 from which it passes to the plenum 286 and then otherwise as described regarding the FIG. 1 example.

FIG. 2A also shows a seal 450 sealing between the forward plug 402 and the shaft. The example seal 450 is a radially inwardly open metallic C-seal sandwiched between mating shoulders of the shaft and first portion 402 in axial compression. The example seal is located at a junction between the web 406 and the sleeve portion 410. The radially open nature and associated axial pinch may offer benefits relative to a radial pinch (axially open C-seal). It may be more resistant to disengagement from differential diametric thermal growth. it may require less precision or other wise be simpler or less costly.

The FIG. 2 embodiment of a plug 400, lacking connection at the hub, may gain gap area near the engine centerline. However, the example configuration loses gap area near the plug OD or shaft ID. The sleeve portions may help absorb thermal gradients and accommodate differential thermal expansion in that the temperature may be much less at the joint/connection 414 than relatively forward at the forward junction of the forward plug and shaft.

Figure 3:
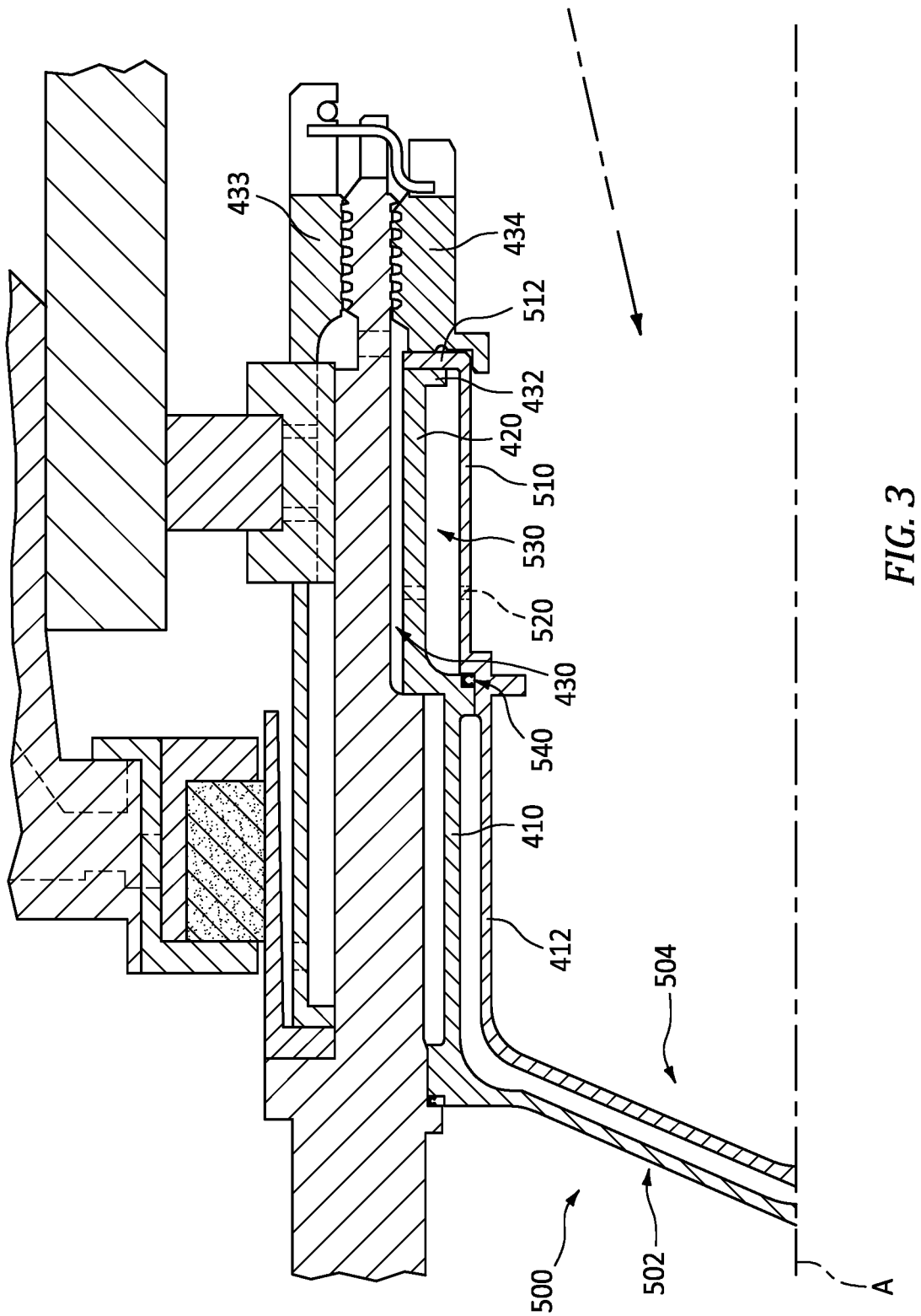
FIG. 3 is an enlarged central sectional view of the rear bearing area of a second alternate gas turbine engine.

FIG. 3 shows a further variation 500 on the FIG. 2 configuration and otherwise similar wherein the welding or brazing at the FIG. 2A connection 414 is replaced by an axial compression stacking. Thus, this may be more amenable to the use of differing CTE materials discussed above. Whereas the FIG. 2 aft plug configuration ends at its inward radial web 418, the FIG. 3 aft plug 504 has a second sleeve section 510 extending further aft. At an aft end of the second sleeve section, a radial web or flange 512 extends outward and has a forward face abutting the aft face of the aft sleeve portion to be held in axial compression via the ID nut. Ports 520 in the sleeve define an inner plenum 530 which in turn feeds the plenum 430 as an outer plenum. An example metallic seal 540 (e.g., radially inwardly open) seals the two portions at a forward end of the inner plenum.

In one or more implementations and relative to one or more baselines or other comparables, the double plug may enable higher temperature capability. For example, it may allow the interference fit with the shaft to stay tight. It may offer better thermal soakback capability (higher resistance to oil coking and auto ignition) due to the air gap between the shaft plug walls for greater insulation and lower surface temperature inside the bearing compartment.

When present, the steps in the shaft plug geometry may take advantage of centrifugal force to direct oil away from the potential leak path forward.

Component materials and manufacture techniques and assembly techniques may be otherwise conventional. In one group of examples, the plug sections may be machined from stock. Additionally, as one example of installing the plug of FIGS. 1A-C, first, the forward retaining ring 222 is installed into the LPT shaft forward groove. The large metallic C-seal 170 is heated (e.g., oven heated) to expand it and then installed onto the forward plug 152. Depending on implementation, the seal 170 may be allowed to cool and shrink. Next, a tool (e.g., hydraulic or pneumatic) is used to press the forward plug 152 into the LPT shaft. Then the aft retaining ring 220 is installed into the LPT shaft aft groove. The small metal C-seal 244 is installed into the groove on the forward plug hub. Next, the O-ring 172 is installed into the OD groove on the aft plug 154. Then the aft plug is installed into the shaft and pressed onto the forward plug using a tool (e.g., hydraulic or pneumatic) for an interference fit. Finally, the bolt 232 is installed to secure the aft plug to the forward plug.

The example FIG. 2 configuration may, in one or more embodiments, allow preassembly of two initially separate plug pieces and/or avoid use of insertion via a driven tool (e.g., hydraulic or pneumatic) to create the initial interference. Thus, in one group of examples, the two pieces may be pre-welded before installation. The seal 450 may be installed either to the shaft or the forward plug and then the forward plug (or combination of two plugs) inserted into the shaft. The internal nut 434 may then be threaded into the shaft to axially compress the seal 450 and the shoulder engagement of the outer portion and shaft aft thereof. The castellated lock washer(s) 350, 436 and lock wire 352 may then be installed (assuming the outer nut 433 has already been installed or once the outer nut 433 is installed in conventional fashion).

Example installation of the FIG. 3 configuration may be generally similar to the FIG. 2 configuration. However, it may be easier to install the two plugs sequentially. Again, the forward plug 502 and its seal 450 may be installed followed by the aft plug 504 and its seal 540 followed by the inner nut 434. The use of axial compression seals avoids the need for pre-interference.

Even for a given physical layout, different assembly sequences may be applicable based upon preexisting or chosen assembly conditions. For example, issues of horizontal assembly versus vertical assembly may influence assembly sequence and what subassemblies are formed (e.g., whether a given seal is preassembled to one of its two mating structures or the other).

The use of "first", "second", and the like in the following claims is for differentiation within the claim only and does not necessarily indicate relative or absolute importance or temporal order. Similarly, the identification in a claim of one element as "first" (or the like) does not preclude such "first" element from identifying an element that is referred to as "second" (or the like) in another claim or in the description.

Where a measure is given in English units followed by a parenthetical containing SI or other units, the parenthetical's units are a conversion and should not imply a degree of precision not found in the English units.

One or more embodiments have been described. Nevertheless, it will be understood that various modifications may be made. For example, when applied to an existing baseline configuration or engine assembly process, details of such baseline may influence details of particular implementations. Accordingly, other embodiments are within the scope of the following claims.

What is claimed is:

1. A gas turbine engine comprising:
a shaft having an inner diameter surface forming a radial interior of the shaft;
a plug mounted in the radial interior of the shaft; and
an oil nozzle positioned to direct a flow of oil to the radial interior of the shaft,
wherein:
the plug has:
  a first section;
  a second section; and
  an axial gap between the first section and the second section;
the engine has a high pressure spool with a high pressure turbine and a low pressure spool with a low pressure turbine; and
the shaft is a low pressure turbine shaft.

2. The gas turbine engine of claim 1 wherein:
the oil nozzle is positioned to direct the flow of oil as a cooling flow to the second section.

3. The gas turbine engine of claim 1 wherein:
the axial gap between the first section and the second section has a radial span of at least 30% of a radial span of the plug.

4. The gas turbine engine of claim 1 wherein:
the axial gap between the first section and the second section extends over at least 30% of a transverse footprint of the plug.

5. The gas turbine engine of claim 1 wherein:
the axial gap between the first section and the second section has an axial length of at least 1.0 mm over at least 30% of a transverse footprint of the plug.

6. The gas turbine engine of claim 1 wherein:
the axial gap is a full annulus gap.

7. The gas turbine engine of claim 1 wherein:
the first section has an outer diameter periphery interference fit to the shaft inner diameter surface.

8. The gas turbine engine of claim 1 further comprising:
a metallic C-seal sealing the first section to the shaft inner diameter surface; and
a non-metallic seal sealing the second section to the shaft inner diameter surface.

9. The gas turbine engine of claim 1 wherein:
a first piece forms the first section including a hub; and
a second piece, mounted to the first piece, forms the second section.

10. The gas turbine engine of claim 9 wherein:
a threaded fastener extends centrally through the second piece into threaded engagement with the first piece forms means to secure the second piece to the first piece.

11. The gas turbine engine of claim 1 wherein:
the first section is a stainless steel; and
the second section is a nickel alloy.

12. The gas turbine engine of claim 1 wherein:
the first section is a first cup-shaped structure having a sidewall extending aft from a forward web;
the second section of a second cup-shaped structure having a sidewall extending aft from an aft web; and
the sidewall of the second cup-shaped structure has an aft junction with the sidewall of the first cup-shaped structure.

13. The gas turbine engine of claim 12 wherein:
the junction comprises a weld joint.

14. The gas turbine engine of claim 12 wherein:
the first cup-shaped structure sidewall has a step bearing against a shoulder of the shaft.

15. The gas turbine engine of claim 1 further comprising:
a bearing supporting the shaft in a bearing compartment; and
a seal sealing the bearing compartment.

16. The gas turbine engine of claim 15 further comprising:
a rear cover for the bearing compartment.

17. The gas turbine engine of claim 16 wherein:
the gas turbine engine lacks a buffer air flowpath centrally through the shaft to the bearing compartment.

18. The gas turbine engine of claim 15 further comprising:
one or more apertures through the shaft for passing oil from the flow of oil to lubricate the bearing.

19. A method for using the gas turbine engine of claim 1, the method comprising:
driving rotation of the shaft; and
passing the flow of oil to contact the second section, the rotation of the shaft centrifugally driving the flow radially outward to pass through one or more apertures in the shaft to lubricate the bearing.

20. The method of claim 19 wherein:
there is not a cooling airflow directed to the first section.

21. The gas turbine engine of claim 15 wherein:
the shaft has a rear end; and
the oil nozzle is behind the shaft or protruding into the shaft rear end to direct the oil flow against an aft surface of the plug.

22. A gas turbine engine comprising:
a shaft having an inner diameter surface forming a radial interior of the shaft;
a plug mounted in the radial interior of the shaft; and
an oil nozzle positioned to direct a flow of oil to the radial interior of the shaft,
wherein:
the plug has:
  a first section;
  a second section; and
  an axial gap between the first section and the second section; and
the axial gap includes one or more of:
  a radial span of at least 30% of a radial span of the plug;
  extending over at least 30% of a transverse footprint of the plug; and
  an axial length of at least 1.0 mm over at least 30% of the transverse footprint of the plug.

\* \* \* \* \*